Patented Oct. 1, 1940

2,216,552

UNITED STATES PATENT OFFICE 2,216,552

PHOSPHORIC POLYMERIZATION IN THE ABSENCE OF OXYGEN

William P. Gage, Deer Park, Tex., and Richard M. Deanesly, Berkeley, Calif., assignors to Shell Development Company, San Francisco, Calif., a corporation of Delaware No Drawing. Application February 21, 1939, Serial No. 257,654

8 Claims. (Cl. 196—10)

This invention relates to the catalytic polymerization of unsaturated hydrocarbons and more particularly is concerned with an improvement of polymerizing with a phosphoric acid catalyst of low boiling olefines such as those having 2 to 6 carbon atoms, in the absence of free oxygen.

It is a purpose of this invention to reduce the cost of polymerizing unsaturated hydrocarbons by prolonging the life of phosphoric acid polymerization catalysts. Another object of the invention is to improve the uniformity of the polymerization reaction and to increase the capacity of the polymerizer by increasing the catalyst life. It is a further purpose to prevent free oxygen, which we have recognized as a poison for phosphoric acid catalysts, from coming in contact with the catalyst.

It is known that solid phosphoric acid catalysts are capable of effectively polymerizing olefines, especially the normally gaseous olefines of 3 to 5 carbon atoms per molecule, at varying temperatures and pressures to form polymers, particularly dimers and trimers which in themselves or upon hydrogenation are useful as high antiknock gasolines. By solid phosphoric acid catalysts we refer to those catalysts comprising phosphoric acid such as an ortho, meta, or pyro phosphoric acid deposited on certain solid carriers such as silicates, silica, carbon, coke, charcoal and the like. If desired such catalysts may contain $BiPO_4$ or $CdPO_4$ or other phosphoric acid salts generally. Polymerization temperatures normally vary from about 300° to 600° F. and pressures up to about 2000 lbs. are most commonly employed.

In the course of the polymerization the catalyst gradually loses its activity. This decline, the rapidity of which may vary with conditions, is generally believed to be due to poisoning of the catalyst or to physical or chemical changes or both in the catalyst.

We have discovered that one of the reasons for a relatively rapid decline in the activity of phosphoric acid catalysts may be the presence of free oxygen in the feed. Traces of free oxygen are always present in the polymerizing system unless positive steps are taken to prevent its entrance. One of the most frequent sources of oxygen lies in the contacting of the olefinic feed with aqueous treating solutions used for the purpose of refining the feed. Other potential sources are pumps.

The amount of free oxygen present is often so small that ordinary analytical methods will fail to detect it, but good evidence of its presence is shown by the difference in catalyst life and/or by the color and odor of the polymer after positive steps have been taken to remove it prior to polymerization.

According to our invention we carry out the polymerization in the presence of a minimum practical amount, and preferably in the total absence of free oxygen. This may be accomplished in two ways, either by preventing the free oxygen from entering the system or by removing it after it has entered the system.

If the free oxygen is being introduced into the olefinic feed by aqueous treating solutions, an economical method of keeping at least a portion of the oxygen out comprises deaerating the aqueous solution prior to treating the feed, for instance by conventional deaeration as by boiling same. If on the other hand the free oxygen already is in the system it may be removed by various methods such as passing the feed through a vessel containing an oxygen absorbing substance, e. g., Cu, Fe, Mg, alkali metals, phosphorus, alkaline solutions of cuprous oxide, etc., under conditions substantially completely to remove the free oxygen from the polymerization feed. Since as previously pointed out analytical methods for detection of free oxygen may be insufficient, the only way in which to determine the presence of harmful quantities of free oxygen may consist of comparative polymerization tests before and after treatment for the removal of oxygen.

The loss of activity of the catalyst caused by the presence of free oxygen is believed to be due to the formation of resins which coat the catalyst thereby rendering it ineffective. Apparently under the conditions of the polymerization the combined action of free oxygen and the phosphoric acid catalyst causes the formation of resins from certain components of the feed. Most likely these components are di-olefines. Our view is substantiated by comparative tests which have shown a comparatively large amount of resin formation when free oxygen is present.

To demonstrate the effect of free oxygen on catalyst life a feed consisting essentially of a $C_4$ fraction containing olefines and free from oxygen was passed over a phosphoric acid-silica catalyst at 338° F. under a pressure of 600 lbs. The decline in catalyst activity was measured and the total catalyst life calculated to be 80 gallons of polymer per lb. of catalyst. To the same feed stock .24% by weight of oxygen was added and passed over a fresh catalyst as above. Under these conditions this catalyst had a life of about 8 gallons of polymer per lb. of catalyst.

The following examples illustrate the benefit which can be had by following our invention:

Example I

The distillate vapors of a mineral oil cracked in a conventional Dubbs cracking unit were fractionally distilled to produce a narrow boiling $C_3$ and $C_4$ fraction containing olefines. This fraction contained a small amount of $H_2S$ and was therefore treated with an aqueous solution of NaOH. The resulting treated fraction was passed at 460° F., and 1150 lbs. per sq. in. at a rate of .75 gal. per hour per lb. of catalyst over a phosphoric acid catalyst consisting essentially of a calcined mass of phosphoric acid deposited on silica. The reaction was carried on until the conversion of the olefines had dropped to a certain predetermined minimum. The reactor was then charged with a fresh batch of the same catalyst, and polymerization was continued under the same conditions with the above feed, which, however, had been pretreated with an aqueous NaOH solution deaerated by boiling. Results obtained were as follows:

|  | Feed treated with ordinary aqueous NaOH solution | Feed treated with deaerated aqueous NaOH solution |
| --- | --- | --- |
| Percent of overall conversion of olefines to polymer | 69.3 | 84.0 |
| Gallons of polymer per pound of catalyst | 50.8 | 190.8 |
| Resins formed: | | |
| Percent of catalyst by weight | 13.1 | 7.6 |
| Percent of feed by weight | .0134 | .0021 |

Example II

A butane-butylene fraction known to contain a trace of oxygen was passed through two successive guard tubes containing sponge iron and active reduced copper respectively, maintained at 250° C. The resulting pretreated feed was then conveyed through the polymerizer containing a phosphoric acid-silica polymerization catalyst at a rate of 8.68 lbs./lb. of catalyst/hr. at a pressure of 600 lbs. and a temperature of 170° C. The iron in the guard tube was oxidized and the copper blackened, thus showing the removal of oxygen. The resulting polymer had an improved color and odor over a polymer produced from the same feed without removing the oxygen prior to polymerizatoin. However, in this particular instance the amount of oxygen contained in the feed was insufficient to materially shorten the catalyst life.

We claim as our invention:

1. In the process of polymerizing normally gaseous hydrocarbons with a solid phosphoric acid catalyst the steps comprising refining said hydrocarbons by treating with a deaerated aqueous treating solution and contacting the resulting hydrocarbons which are substantially free from oxygen with said phosphoric acid catalyst.

2. The process of claim 1 in which the catalyst is a calcined phosphoric acid-silica catalyst.

3. In the process of polymerizing normally gaseous olefine hydrocarbons containing free oxygen with a solid phosphoric acid catalyst the step comprising removing said oxygen and contacting the hydrocarbons with said phosphoric acid catalyst under polymerizing conditions.

4. In the process of polymerizing normally gaseous olefine hydrocarbons containing free oxygen with a solid phosphoric acid catalyst the step comprising contacting said hydrocarbons with an oxygen absorbing substance under conditions to remove oxygen and thereafter contacting the resulting hydrocarbons with said phosphoric acid catalyst under polymerizing conditions.

5. The process of claim 4 in which the oxygen absorbent is a metal selected from the group consisting of Cu, Fe and Mg.

6. The process of claim 4 in which the oxygen absorbing substance is an alkaline solution of cuprous oxide.

7. In the process of polymerizing normally gaseous olefine hydrocarbons containing $H_2S$ with a solid phosphoric acid catalyst the steps comprising treating said hydrocarbons with a deaerated alkaline aqueous solution capable of removing $H_2S$ and polymerizing the resulting treated hydrocarbons with said catalyst under polymerizing conditions.

8. In the process of treating normally gaseous hydrocarbons with an aqueous treating solution containing oxygen and polymerizing the treated hydrocarbons with a phosphoric acid catalyst the steps comprising de-aerating the aqueous treating solution, treating the normally gaseous hydrocarbons with said de-aerated aqueous-treating solution and contacting the resulting hydrocarbons which are substantially free from oxygen with said phosphoric acid catalyst.

WILLIAM P. GAGE.
RICHARD M. DEANESLY.